Sept. 20, 1932.  G. H. KOCH  1,877,767
ELECTRIC WELDING
Filed March 6, 1929
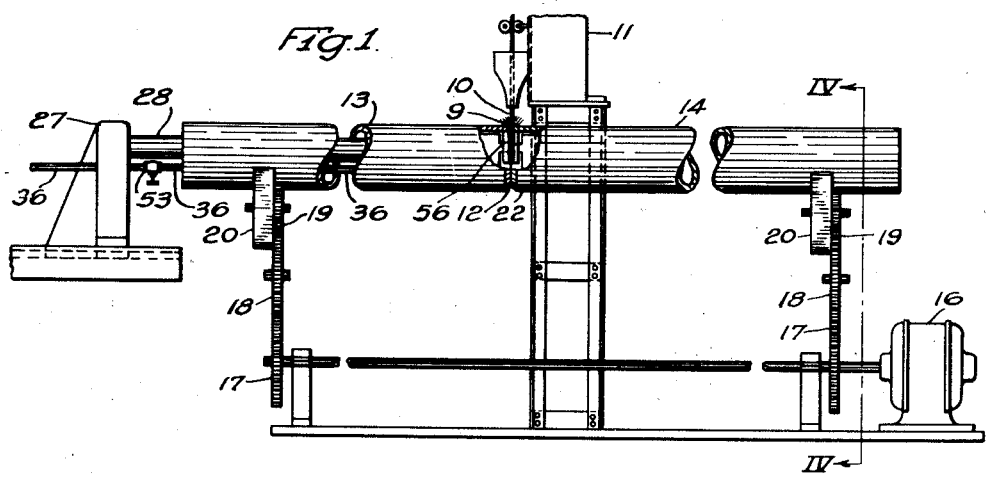
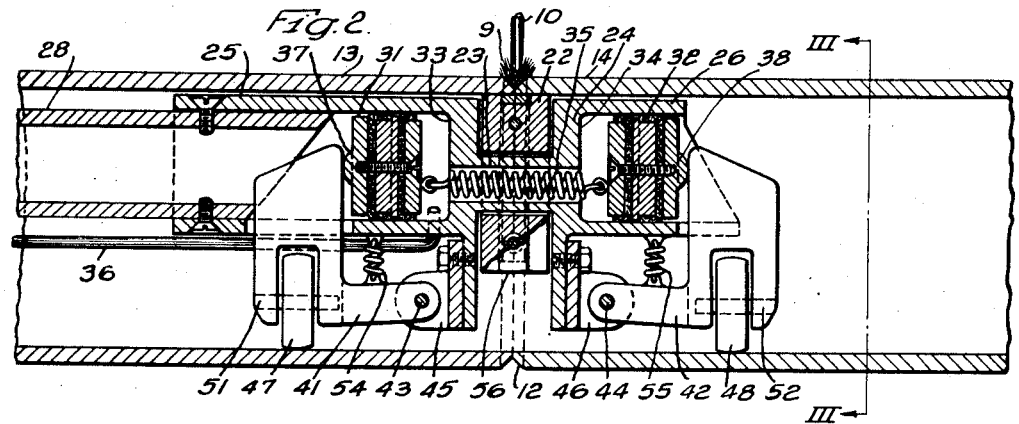
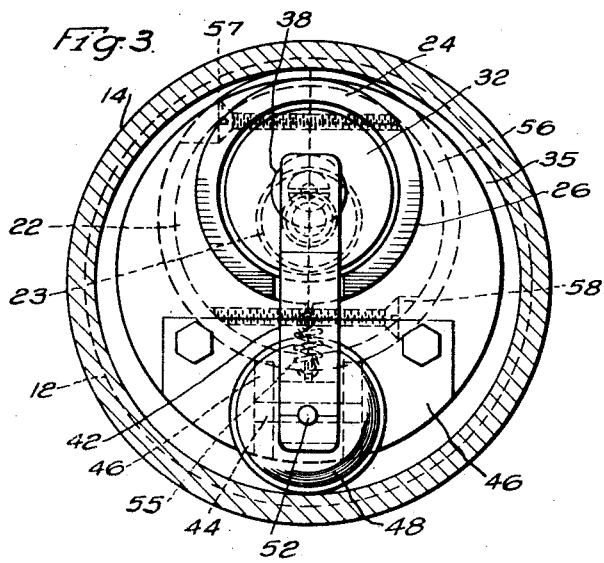
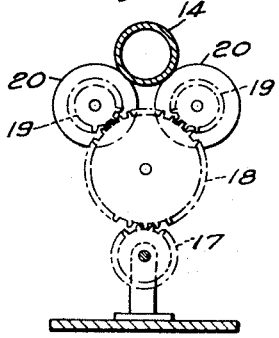
INVENTOR
*Gustav H. Koch.*
BY
ATTORNEY Patented Sept. 20, 1932

1,877,767

UNITED STATES PATENT OFFICE

GUSTAV H. KOCH, OF WILKINSBURG, PENNSYLVANIA, ASSIGNOR TO WESTINGHOUSE ELECTRIC & MANUFACTURING COMPANY, A CORPORATION OF PENNSYLVANIA

ELECTRIC WELDING

Application filed March 6, 1929. Serial No. 344,736.

My invention relates to arc welding machines wherein a backing member is maintained in contact with the weld, during the welding operation.

The object of the invention, generally stated, is to provide a chill or backing member, for carrying off heat generated during the welding operation, that may be readily forced into intimate thermal engagement with the work surface in a manner to prevent excessive fusion thereof.

It is also an object of the invention to provide a backing member for circumferential seams that is simple in construction and positive in action.

In the arc welding of metal parts, the edges to be united are commonly placed in juxtaposition, and a chill or backing member is brought into contact therewith for the purpose of cooling the weld metal. With this arrangement, difficulty is frequently encountered in the welding of either horizontal or circumferential seams because of the fact that the edges do not lie smoothly on the backing member, thus varying the degree of thermal contact, whereby the metal is burned or an unevenness in the thickness of the weld is produced at the points where the metal parts are out of contact with the backing member.

In accordance with my invention, burning of the metal and irregularity in weld thickness is prevented by the provision of a rotatably mounted backing roll which is adapted to be forced into the irregularities of the work.

Other objects of the invention will, in part, be obvious and, in part, appear hereinafter.

This invention, accordingly, is disclosed in the embodiment thereof shown in the accompanying drawing and comprises the features of construction, combination of elements and arrangement of parts which will be exemplified in the construction hereinafter set forth, and the scope of the application of which will be indicated in the claims.

For a further understanding of the objects of the invention, reference may be had to the following detailed description, taken in connection with the accompanying drawing wherein:

Figure 1 is a side elevation of a machine for the arc welding of a circumferential seam.

Fig. 2 is a vertical sectional view showing, in detail, a device embodying my invention.

Fig. 3 is an enlarged vertical sectional view along the line III—III of Fig. 2, showing details of construction, and Fig. 4 is an end view along the line IV—IV, showing details of the driving means for the work material.

Referring now to the drawing, 10 designates a metallic-wire electrode that is fed by an automatic welding head 11 to or from a circumferential seam 12 formed by abutting ends of tubes 13 and 14 to be welded. Between the electrode and the upper surface of the seam, a welding arc, 9 is maintained, in a manner well understood in the art, while a motor 16 rotates the tubes to be welded by means of reduction gears 17, 18, and 19 and driving rolls 20.

As shown in Fig. 2, a backing or chill roll 22 is rotatably mounted on a hollow bearing 23 constituting a part of a frame 24. The frame consists of opposed, hollow, cylindrical flange members 25 and 26 supported from a pedestal 27 by means of an arm 28. Fluid-responsive pistons 31 and 32 within the cylindrical members are normally held against cylinder heads 33 and 34 by means of a tension spring 35.

Upon admitting fluid from a pipe 36 into the cylinder chambers, the pistons are propelled in opposite directions against the retracting spring 35. As the pistons move outwardly, boss portions 37 and 38 thereof engage the free ends of lost-motion bell cranks 41 and 42, respectively. This causes the respective cranks to pivot on pins 43 and 44 which extend through the inner crank ends and through brackets 45 and 46, respectively, attached to the main frame until rollers 47 and 48, mounted in the recesses in the cranks on pins 51 and 52, engage the inner walls of the tubes to be welded. Upon further application of pressure, each bell crank rocks about the point of contact between its roller and the tube wall, thus raising the main frame member until the chill or backing roll is forced into contact with the circumferential seam.

It will be understood that, when the fluid pressure is released by operating the two-way valve 53, spring 35 returns the pistons to their normal positions, and springs 54 and 55 raise the rollers from engagement with the walls of the tubular members. In this normal position, the welded tubes may be easily removed and new sections assembled preparatory to welding.

It will be observed that, when the backing member is brought into contact with the abutting edges of the tubular member, the rotation imparted to the tubes by the drive rolls will cause the backing roll to turn and thus continuously present a new point of contact to the seam as the welding progresses. By reason of the difference in diameters of the backing roll and the circumferential seam, the contacting portions separate in paths having different radial components. As a result, any weld metal that may tend to fuse to the surface of the backing roll is subjected to a progressive tensional strain of such magnitude that adhesion of the rotating members is prevented.

By inserting a band 56 of heat-resisting and heat-absorbing metal, such as copper or brass, in that portion of the surface of the chill roll directly under the weld metal the useful life of the backing member may be substantially increased, and the tendency of the weld metal to fuse to the backing member, diminished.

It will be readily understood that a given frame structure may be employed for use with a large variety of tube sizes by merely changing the outside diameter of the chill roll, which may be made replaceable by forming it in two sections, held together normally by machine screws 57 and 58, as shown in Fig. 3, and by altering the position of the bracket members 45 and 46 a corresponding amount.

I would state, in conclusion, that, while the illustrated example constitutes a practical embodiment of my invention, I do not limit myself strictly to the exact details herein illustrated, since modifications of the same may be considerably varied without departing from the spirit of the invention, as defined in the appended claims.

Having described my invention, what I desire to claim as new and secure by Letters Patent is:

1. In a welding machine, a backing member rotatably mounted on a supporting frame comprising a bearing for said backing member, a hollow cylindrical member constituting a part of said frame, a fluid-actuated piston within said cylindrical member, and means pivotally mounted on said frame and operated by said piston for raising said backing member.

2. In a welding machine, a backing member rotatably mounted on a supporting frame comprising a bearing for said backing member, a hollow cylindrical member constituting a part of said frame, a fluid-actuated piston within said cylindrical member, a retracting member disposed to cooperate with said piston for biasing it to a predetermined position, and means pivotally mounted on said frame and operated by said piston for lowering said backing member.

3. In a welding machine, a backing member rotatably mounted on a supporting frame comprising a bearing for said backing member, a hollow cylindrical member constituting a part of said frame, a fluid-actuated piston within said cylindrical member, a retracting member disposed to cooperate with said piston for biasing it to a predetermined position, and means pivotally mounted on said frame and operated by said piston for raising or lowering said backing member.

4. In a welding machine, a backing member rotatably mounted on a supporting frame comprising a bearing for said backing member, a hollow cylindrical member constituting a part of said frame, a fluid-actuated piston within said cylindrical member, a retracting member disposed to cooperate with said piston for biasing it to a predetermined position, means pivotally mounted on said frame and operated by said piston for raising or lowering said backing member, and a normally stationary arm attached to said frame and supported from a pedestal.

5. In a machine for the arc welding of abutting tubular members, a main frame disposed within said tubular members comprising a rotatable backing member adapted to make contact with the inner surface of the weld metal, and fluid-operated means pivoted to said frame and in engagement with the inner surface of said tubular members for forcing said backing member into contact with the weld metal at a point substantially opposite the arc.

6. In a machine for the arc welding of abutting tubular members, a means for rotating said members, a main frame disposed within said tubular members comprising a rotatable backing member adapted to make contact with the inner surface of the weld metal, fluid-operated means pivoted to said frame and in engagement with the inner surface of said tubular members for forcing said backing member into contact with the weld metal at a point substantially opposite the arc, and a guiding arm extending from said frame.

7. In a welding machine in which the abutting ends of pipes are to be welded together, in combination, a rotatable backing member, a support for the rotatable backing member, a plurality of arms secured to the support and provided with rollers, and fluid pressure means associated with the support for moving the backing member and the rollers in opposite directions and into engagement with the inner surface of the pipes.

8. In a welding machine for making circumferential welds along abutting ends of pipes, in combination, a rotatable backing member, a support member for the rotatable member, said support member being provided with a pair of oppositely disposed cylinders, a pair of pistons located in the cylinders, resilient means for biasing the pistons toward each other, a pair of arms pivotally mounted on the support member and disposed to cooperate with the pistons, said arms being provided with rollers for engaging the inner surface of the pipes and means for applying fluid pressure to the pistons for actuating the backing member into engagement with the inner periphery of the abutting ends of the pipes.

In testimony whereof, I have hereunto subscribed my name this first day of March, 1929.

GUSTAV H. KOCH.